US012645627B2

(12) United States Patent
Geary et al.

(10) Patent No.: US 12,645,627 B2
(45) Date of Patent: Jun. 2, 2026

(54) FIBRE CHANNEL PROTOCOL EXCHANGE HANDLING

(71) Applicant: Dell Products L.P., Round Rock, TX (US)

(72) Inventors: Niall Geary, Ballinlough (IE); Scott Rowlands, Cumming, GA (US); Philip O'Carroll, Monkstown (IE)

(73) Assignee: Dell Products L.P., Round Rock, TX (US)

( * ) Notice: Subject to any disclaimer, the term of this patent is extended or adjusted under 35 U.S.C. 154(b) by 63 days.

(21) Appl. No.: 18/646,206

(22) Filed: Apr. 25, 2024

(65) Prior Publication Data

US 2025/0335383 A1      Oct. 30, 2025

(51) Int. Cl.
*G06F 13/38* (2006.01)
*G06F 13/10* (2006.01)
*G06F 13/42* (2006.01)

(52) U.S. Cl.
CPC .......... *G06F 13/387* (2013.01); *G06F 13/102* (2013.01); *G06F 13/4282* (2013.01)

(58) Field of Classification Search
CPC ... G06F 13/387; G06F 13/102; G06F 13/4282
USPC ...................................... 710/3, 9, 18, 28, 33
See application file for complete search history.

(56) References Cited

U.S. PATENT DOCUMENTS

| | | | | |
|---|---|---|---|---|
| 9,264,384 B1 * | 2/2016 | Sundaresan | ......... | G06F 13/4022 |
| 2010/0131693 A1 * | 5/2010 | Chien | ................. | G06F 11/3485 |
| | | | | 711/E12.001 |
| 2014/0006659 A1 * | 1/2014 | Foong | ................... | G06F 12/063 |
| | | | | 710/74 |
| 2014/0173017 A1 * | 6/2014 | Takagi | ................... | G06F 3/067 |
| | | | | 709/213 |
| 2020/0133773 A1 * | 4/2020 | Lingarajappa | ...... | G06F 11/1076 |

* cited by examiner

*Primary Examiner* — Idriss N Alrobaye
*Assistant Examiner* — Henry W Yu
(74) *Attorney, Agent, or Firm* — Daly, Crowley, Mofford & Durkee, LLP

(57) ABSTRACT

A method for use in a computing device, the method comprising: obtaining, by a processor of the computing device, an indication of a pool of exchange numbers, the indication of the pool of exchange numbers being obtained from a host bus adapter (HBA) of the computing device; pre-mapping each of a plurality of first slots in a driver memory of the computing device to the pool of exchange numbers, wherein pre-mapping each of the plurality of first slots includes updating a first data structure to map each of the plurality of first slots to a respective one of the exchange numbers in the pool; and using, by the processor, the plurality of first slots to execute one or more exchanges that involve the HBA, the exchanges being initiated after the pre-mapping is performed.

20 Claims, 6 Drawing Sheets

Figure 2A:
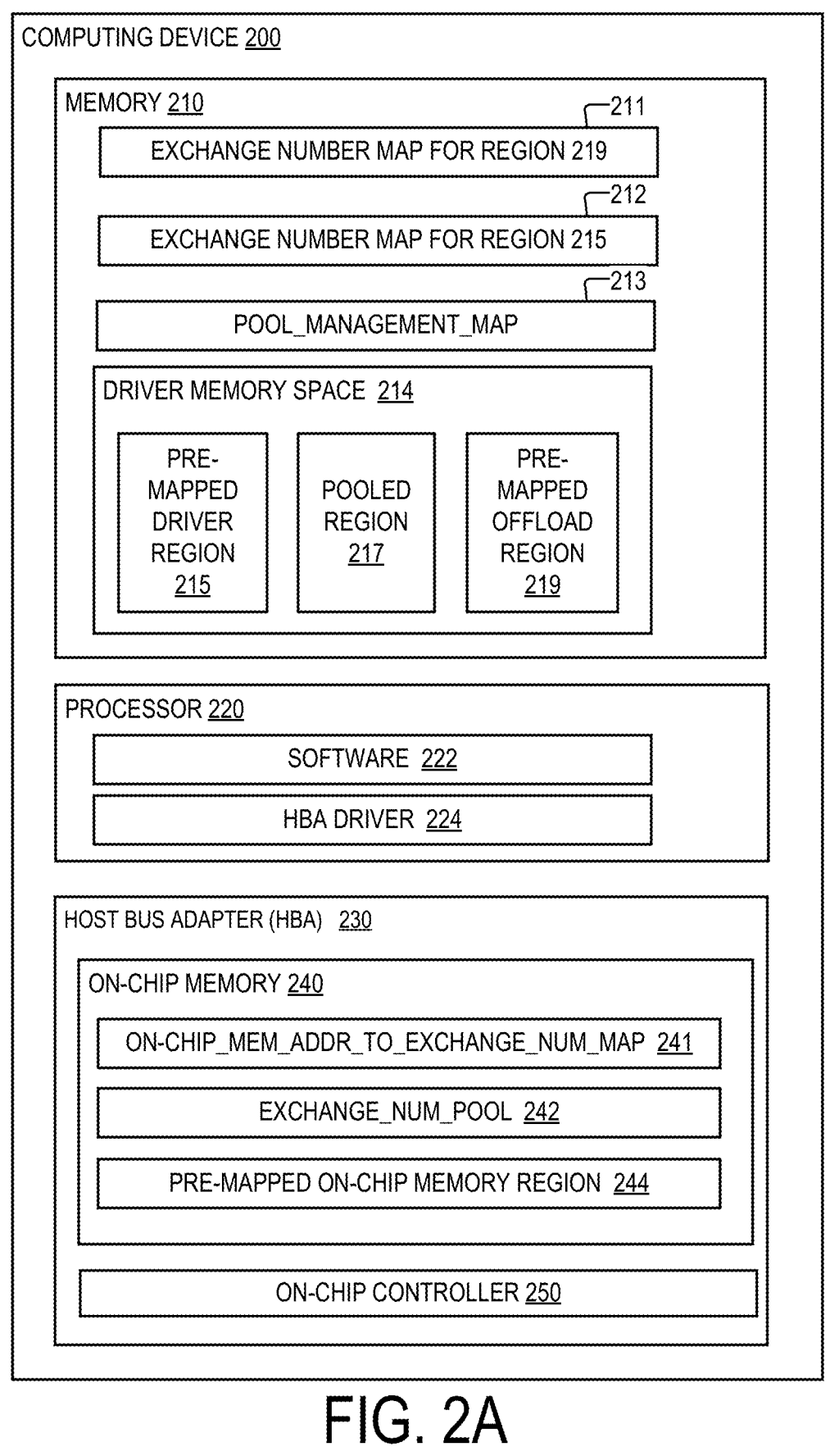

COMPUTING DEVICE 200

MEMORY 210

211
EXCHANGE NUMBER MAP FOR REGION 219

212
EXCHANGE NUMBER MAP FOR REGION 215

213
POOL_MANAGEMENT_MAP

DRIVER MEMORY SPACE 214

PRE-MAPPED DRIVER REGION 215

POOLED REGION 217

PRE-MAPPED OFFLOAD REGION 219

PROCESSOR 220

SOFTWARE 222

HBA DRIVER 224

HOST BUS ADAPTER (HBA) 230

ON-CHIP MEMORY 240

ON-CHIP_MEM_ADDR_TO_EXCHANGE_NUM_MAP 241

EXCHANGE_NUM_POOL 242

PRE-MAPPED ON-CHIP MEMORY REGION 244

ON-CHIP CONTROLLER 250

Figures 2B, 2C, 2D, 2E:
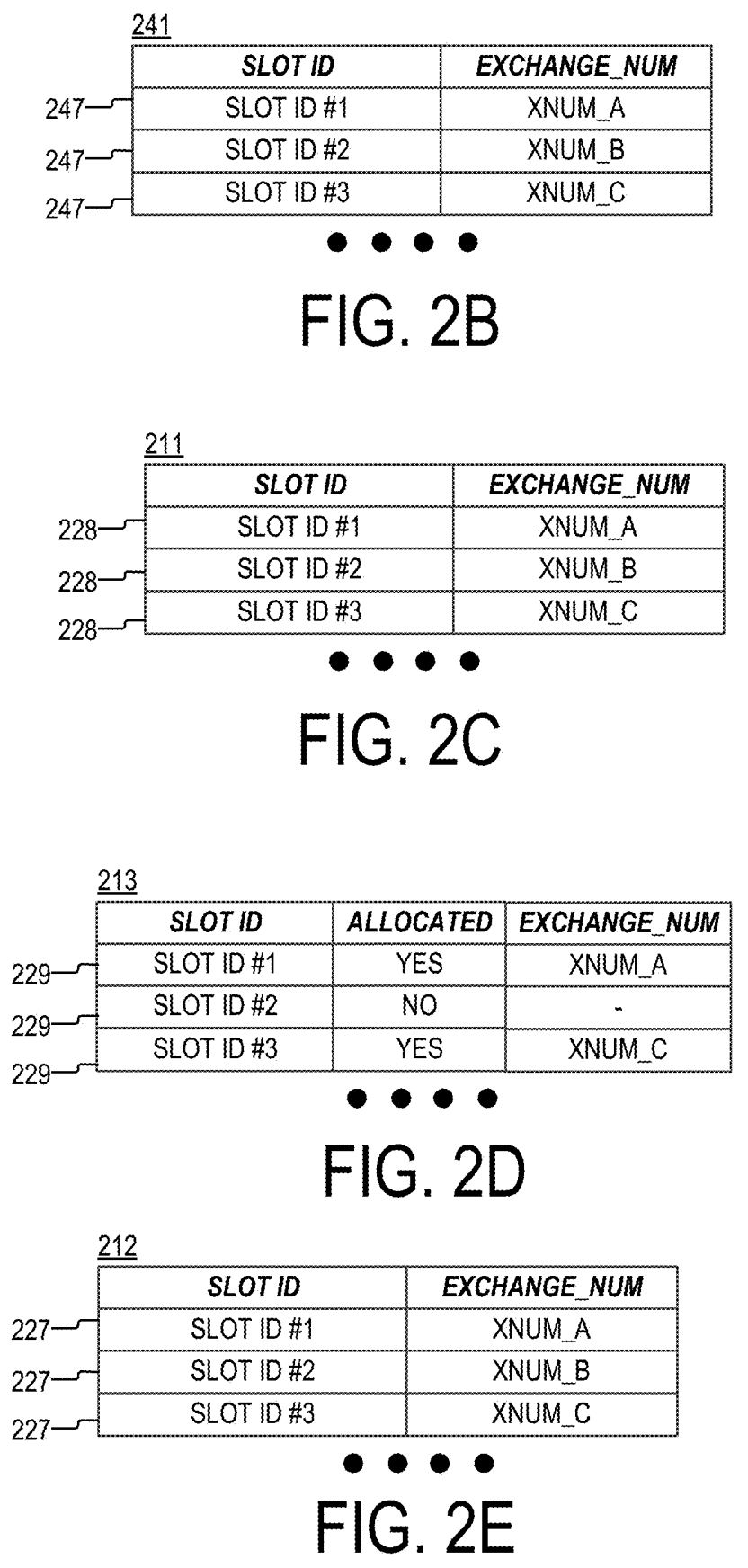

| SLOT ID | EXCHANGE_NUM |
|---------|--------------|
| SLOT ID #1 | XNUM_A |
| SLOT ID #2 | XNUM_B |
| SLOT ID #3 | XNUM_C |

247 — SLOT ID #1
247 — SLOT ID #2
247 — SLOT ID #3

| SLOT ID | EXCHANGE_NUM |
|---------|--------------|
| SLOT ID #1 | XNUM_A |
| SLOT ID #2 | XNUM_B |
| SLOT ID #3 | XNUM_C |

228 — SLOT ID #1
228 — SLOT ID #2
228 — SLOT ID #3

| SLOT ID | ALLOCATED | EXCHANGE_NUM |
|---------|-----------|--------------|
| SLOT ID #1 | YES | XNUM_A |
| SLOT ID #2 | NO | - |
| SLOT ID #3 | YES | XNUM_C |

229 — SLOT ID #1
229 — SLOT ID #2
229 — SLOT ID #3

| SLOT ID | EXCHANGE_NUM |
|---------|--------------|
| SLOT ID #1 | XNUM_A |
| SLOT ID #2 | XNUM_B |
| SLOT ID #3 | XNUM_C |

227 — SLOT ID #1
227 — SLOT ID #2
227 — SLOT ID #3

ASSIGN AN EXCHANGE NUMBER TO AN EXCHANGE THAT INVOLVES A HBA

⌐404

USE PRE-MAPPED DRIVER MEMORY TO STORE DRIVER-SIDE METADATA FOR THE EXCHANGE

⌐406

USE PRE-MAPPED DRIVER MEMORY AS AN OFFLOAD LOCATION FOR STORING HBA-SIDE METADATA FOR THE EXCHANGE

⌐408

USE PRE-MAPPED ON-CHIP MEMORY OF THE HBA TO STORE HBA-SIDE METADATA

FIBRE CHANNEL PROTOCOL EXCHANGE HANDLING

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided for use in a computing device, the method comprising: obtaining, by a processor of the computing device, an indication of a pool of exchange numbers, the indication of the pool of exchange numbers being obtained from a host bus adapter (HBA) of the computing device; pre-mapping each of a plurality of first slots in a driver memory of the computing device to the pool of exchange numbers, wherein pre-mapping each of the plurality of first slots includes updating a first data structure to map each of the plurality of first slots to a respective one of the exchange numbers in the pool; and using, by the processor, the plurality of first slots to execute one or more exchanges that involve the HBA, the exchanges being initiated after the pre-mapping is performed, wherein executing any given one of the exchanges includes assigning, to the given exchange, one of the exchange numbers in the pool and using one of the plurality of first slots that is pre-mapped to the assigned exchange number to store driver-side metadata for the given exchange, wherein the processor is configured to restrict use of each of the plurality of first slots to storing only driver-side metadata associated with exchanges which are assigned the exchange number that is pre-mapped to the first slot.

According to aspects of the disclosure, a system is provided, comprising: a host bus adapter (HBA); a memory module having a portion thereof allocated as a driver memory for the HBA; a processor that is operatively coupled to the memory module and HBA, the processor being configured to perform the operations of: obtaining an indication of a pool of exchange numbers, the indication of the pool of exchange numbers being obtained from the HBA; pre-mapping each of a plurality of first slots in the driver memory to the pool of exchange numbers, wherein pre-mapping each of the plurality of first slots includes updating a first data structure to map each of the plurality of first slots to a respective one of the exchange numbers in the pool; and using the plurality of first slots to execute one or more exchanges that involve the HBA, the exchanges being initiated after the pre-mapping is performed, wherein executing any given one of the exchanges includes assigning, to the given exchange, one of the exchange numbers in the pool and using one of the plurality of first slots that is pre-mapped to the assigned exchange number to store driver-side metadata for the given exchange, wherein the processor is configured to restrict use of each of the plurality of first slots to storing only driver-side metadata associated with exchanges which are assigned the exchange number that is pre-mapped to the first slot.

According to aspects of the disclosure, a non-transitory computer-readable medium is provided that stores one or more processor-executable instructions which, when executed by a processor of a computing device, cause the processor to perform the operations of: obtaining an indication of a pool of exchange numbers, the indication of the pool of exchange numbers being obtained from a host bus adapter (HBA) of the computing device; pre-mapping each of a plurality of first slots in a driver memory of the computing device to the pool of exchange numbers, wherein pre-mapping each of the plurality of first slots includes updating a first data structure to map each of the plurality of first slots to a respective one of the exchange numbers in the pool; and using the plurality of first slots to execute one or more exchanges that involve the HBA, the exchanges being initiated after the pre-mapping is performed, wherein executing any given one of the exchanges includes assigning, to the given exchange, one of the exchange numbers in the pool and using one of the plurality of first slots that is pre-mapped to the assigned exchange number to store driver-side metadata for the given exchange, wherein the processor is configured to restrict use of each of the plurality of first slots to storing only driver-side metadata associated with exchanges which are assigned the exchange number that is pre-mapped to the first slot.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 2A is a diagram of an example of a computing device, according to aspects of the disclosure;

FIG. 2B is a diagram of an example of a data structure, according to aspects of the disclosure;

FIG. 2C is a diagram of an example of a data structure, according to aspects of the disclosure;

FIG. 2D is a diagram of an example of a data structure, according to aspects of the disclosure;

FIG. 2E is a diagram of an example of a data structure, according to aspects of the disclosure;

DETAILED DESCRIPTION

Figure 1:
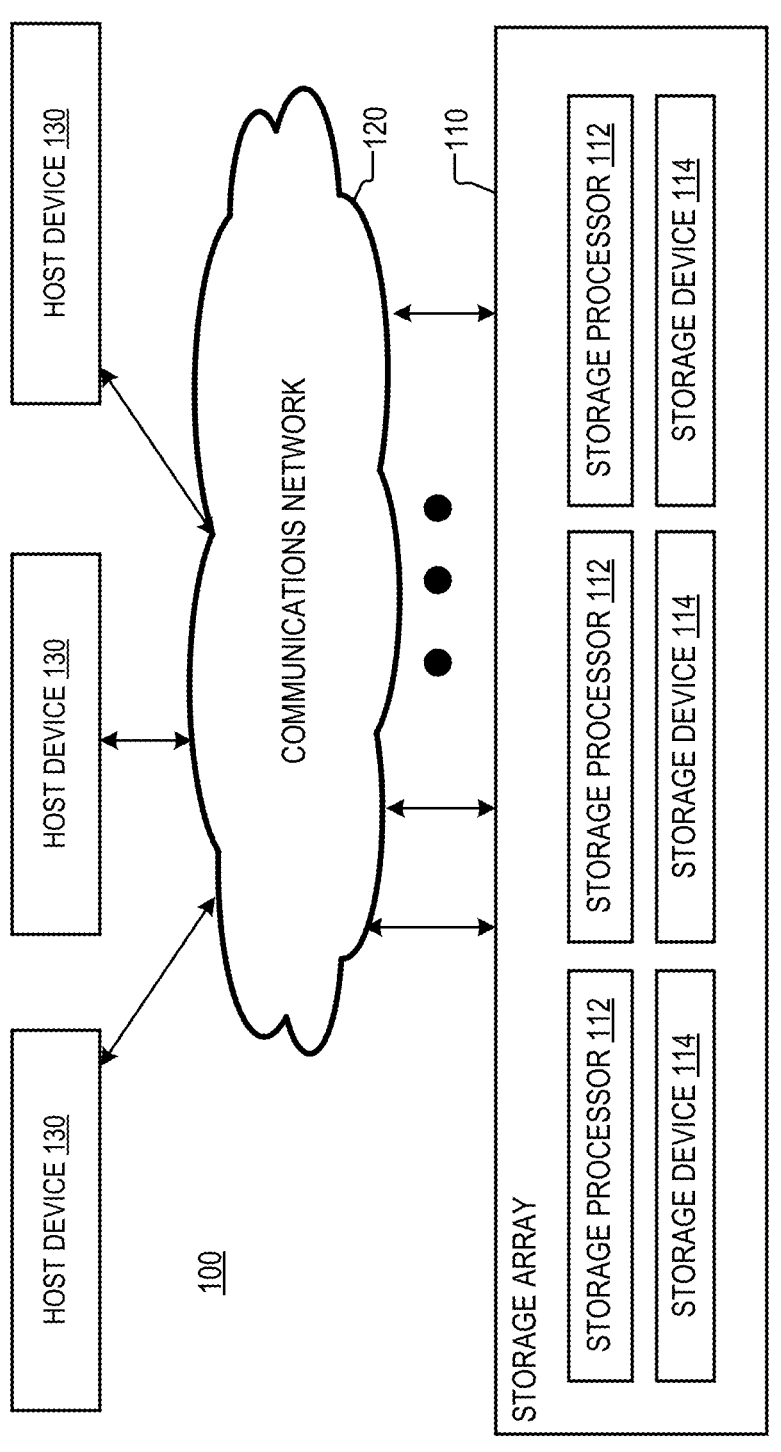
FIG. 1 is a diagram of an example of a system, according to aspects of the disclosure.

FIG. 1 is a diagram of an example of a system 100, according to aspects of the disclosure. As illustrated, system 100 may include a storage system 110, a communications network 120, and a plurality of host devices 130. According to the present example, communications network 120 includes fibre channel (FC) network. Additionally or alternatively, in some implementations, the communications network 120 may include an InfiniBand network. Additionally or alternatively, in some implementations, the communications network 120 may include the Internet, a local area network (LAN), a wide area network (WAN), and/or any other suitable type of network. Each of the host devices 130 may include a computing device, such as the computing device 200, which is discussed further below with respect to FIG. 2A. By way of example, any of the host devices 130 may include a desktop computer, a laptop, or a smartphone, for example. The storage system 110 may include a storage system, such as DELL/EMC Powermax™, DELL Power-Store™, and/or any other suitable type of storage system. The storage system 110 may include a plurality of storage processors 112 and a plurality of storage devices 114. Each of the storage processors 112 may include a computing device, such as the computing device 200, which is discussed further below with respect to FIG. 2A. Each of the storage processors 112 may be configured to receive I/O requests from host devices 130 and execute the received I/O requests by reading and/or writing data to storage devices 114. Each of the storage devices 114 may include one or more of a solid-state drive (SSD), a hard disk (HD), a non-volatile random-access memory (NVRAM) device, a non-volatile memory express (NVMe) device, and/or any other suitable type of storage device.

FIG. 2A is a diagram of a computing device 200, according to aspects of the disclosure. As illustrated, the computing device 200 may include a memory 210, a processor 220, and a host bus adapter (HBA) 230. The memory 210 may include any suitable type of volatile and/or non-volatile memory, such as a solid-state drive (SSD), a hard disk (HD), a random-access memory (RAM), a Synchronous Dynamic Random-Access Memory (SDRAM), etc. The processor 220 may include any suitable type of processing circuitry, such as a general-purpose processor (e.g., an x86 processor, a MIPS processor, an ARM processor, etc.), a special-purpose processor, an application-specific integrated circuit (ASIC), a field programmable gate array (FPGA), etc. According to the present example, HBA 230 includes a Fibre Channel (FC) host bus adapter. However, in alternative implementations, HBA 230 may include an InfiniBand adapter, an Ethernet adapter, and/or any other suitable type of adapter.

The processor 220 may be configured to execute software 222 and a driver 224. Software 222 may include any suitable type of software that is configured to send and receive data via HBA 230, using the services/interface(s) provided by driver 224. By way of example, software 222 may include the operating system of computing device 200 (or a portion thereof) and/or any application or service that is executed in the operating system. Driver 224 may include a software component that enables communication between software 222 and HBA 230. Driver 224 may serve as a translator, allowing software 222 to interact with and control HBA 230. Driver 224 may be a driver of HBA 230. Driver 224 may perform various functions, such as initiating data transfers, managing I/O operations, handling error conditions, and so forth. Driver 224 may provide a standardized interface for communicating with HBA 230.

The host bus adapter HBA 230 may include an on-chip memory 240 and an on-chip controller 250. According to the present disclosure, both the on-chip memory 240 and the on-chip controller 250 are formed on the same die and encapsulated in the same semiconductor package. However, the present disclosure is not limited to any specific implementation of the on-chip memory 240 and the on-chip controller 250. For example, in some implementations, the memory 240 and the controller 250 may be provided in separate semiconductor packages that are mounted on a same circuit board that constitutes the HBA 230. In general, the memory 210 may include DRAM and/or random access memory that serves as general-purpose memory of the computing device, and which is connected to the processor 220 via a double data rate (DDR) memory bus. By contrast, the on-chip memory 240 may be local to the HBA 230 and dedicated to supporting the operation of controller 250. The on-chip memory 240 may include any suitable type of volatile and/or non-volatile memory, such as a solid-state drive (SSD), a hard disk (HD), a random-access memory (RAM), a Synchronous Dynamic Random-Access Memory (SDRAM), etc. The on-chip memory 240 may be connected to the processor 220 via a PCE Express bus or another peripheral bus. The on-chip controller 250 may include any suitable type of processing circuitry, such as a general-purpose processor (e.g., a MIPS processor, an ARM processor, etc.), a special-purpose processor, an application-specific integrated circuit (ASIC), a field programmable gate array (FPGA), etc.

Memory 240 may be configured to store an indication (or definition) of a pool 242 of exchange numbers (also referred to as an "exchange number pool 242"). An exchange number may include a unique number or another unique identifier, such as an alphanumerical string, that is used by HBA 230 to track data exchanges between HBA 230 (and/or computing device 200) and other computing devices (or corresponding HBA adapters). At any given time, each of the exchanges that are pending in HBA 230 is assigned (by controller 250) a different exchange number from the pool, such that no two concurrent exchanges are assigned the same exchange number. When an exchange is assigned a given exchange number from the pool, the exchange number is no longer available for assignment to other exchanges, until the exchange is given completed. When the given exchange is completed, the exchange number again becomes available for assignment to another exchange. In other words, the term "pool of exchange numbers," as used throughout the disclosure, refers to a set of exchange numbers that can be assigned and re-assigned by the controller 250, irrespective of whether any of the exchange numbers in the set is currently assigned to an exchange or not. For the purpose of the discussion of FIGS. 1-5, an exchange number is considered to be part of the pool, even if the exchange number is currently assigned to an exchange.

In one example, an exchange may be executed as part of a write operation to a storage device. In another example, an exchange may be executed as part of a read operation to a storage device. Additionally or alternatively, an exchange may be executed as part of a data transmission (or data reception) operation. In another example, an exchange may be executed as part of a Small Computer System Interface (SCSI). Broadly speaking, the term exchange may refer to any transmission of one or more data frames. The term "exchange number" may refer to any identifier that is used by both an HBA and the driver of the HBA to internally track exchanges.

In conventional systems, an exchange is assigned to one or more slots in the memory 240 when the exchange is initiated. At a high level, the assignment involves mapping an identifier of any of the slots to an exchange number for the exchange after the exchange is initiated. By contrast, in the example of FIG. 2A, memory slots may be mapped to exchange numbers in the pool 242 ahead of time, before any of the exchange numbers is assigned to an exchange. This action is referred to as "pre-mapping". As a result of the memory slots being pre-mapped, metadata for exchanges that have the same exchange number is stored in the same one or more memory slot(s) (i.e., memory slots that are pre-mapped to the exchange numbers). The memory slots that are pre-mapped to a given exchange number may be used to store all or some of the metadata for an exchange that is currently assigned the given exchange number. In conventional systems that do not use pre-mapping, the allocation of memory slots may be unrelated to the exchange numbers of various exchanges, in the sense that the exchange number of an exchange does not determine what slot is allocated to the exchange.

The term "memory slot", as used throughout the disclosure, shall mean "a memory portion". A memory slot may include a single address (or a single block of memory) or multiple addresses ("or multiple blocks of memory"). It will be understood that the term "memory slot," as used throughout the disclosure, does not imply a specific size or structure of the memory portion that constitutes the memory slot. Moreover, it will be understood that memory slots in different memories (or different regions of the same memory) may be implemented differently—e.g., they may have different sizes or one may be contiguous and the other may be non-contiguous. For example, a memory slot in memory 210 may have the same or different size as a memory slot in memory 240. Similarly, a memory slot in region 215 of memory 210 may have the same or different size than the memory slot a memory slot in any of regions 217 and 219. Furthermore, it will be understood that different portions of a memory slot may be independently addressable. Stated succinctly, the term "memory slot" generically refers to a contiguous or non-contiguous memory portion where metadata for the same exchange can be stored.

The present disclosure is not limited to any specific implementation of "memory slots." For example, the memory slots in the same memory region (e.g., any of regions 244, 215, 217, and 219) may have the same memory size or they may have different memory sizes. For example, one memory slot in a region (e.g., one of regions 244, 215, 217, and 219) may consist of two memory blocks (or other storage units) and another memory slot may include 3 memory blocks (or other units). As is discussed further below, a memory slot may be identified by a memory slot identifier. In one example, the memory slot identifier may be a single number or alphanumerical string. In another example, the identifier may include a plurality of numbers or alphanumerical strings, where each identifier or alphanumerical string corresponds to a different block (or other storage unit) that constitutes the memory slot. Stated succinctly, the present disclosure is not limited to any specific implementation of a memory slot.

The term "pre-mapping," as used throughout the disclosure, refers to an association of an exchange number from pool 242 to a memory slot (i.e., in memory 240 and/or memory 210), wherein the association is performed before the exchange number is assigned to an exchange whose metadata the memory slot is subsequently used to store. The exchange may be initiated after the pre-mapping is performed—e.g., seconds, minutes, hours, days, etc. The pre-mapping of a memory slot to an exchange number may be performed when computing device 200 is restarted, when HBA 230 is booted, or at any other suitable time.

The pre-mapping may be performed by using a "map". The term map may refer to a table that associates exchange numbers with identifiers of corresponding memory slots. The table may be implemented as a tree structure and/or any other suitable type of data structure or set of data structures.

Examples of different maps are provided further below with respect to FIGS. 2B, 2C, and 2E.

Memory 240 may include a region 244. Region 244 may include a plurality of memory slots. Each memory slot may be mapped to a respective exchange number in the pool 242 by a map 241. Map 241 may be stored in memory 240 and/or any other suitable location. As illustrated in FIG. 2B, map 241 may include a plurality of entries 247. Each entry 247 may include a respective identifier of one of the plurality of memory slots. Each entry 247 may further include a respective one of the exchange numbers in the pool 242. In general, an entry 247 may be configured to map a given memory slot to a corresponding exchange number when the entry contains both the exchange number and an identifier of the memory slot. In many implementations, more than one slot in region 244 may be mapped to the same reference number.

HBA 230 may be configured to restrict the use of each slot in region 244 to storing HBA-side metadata for exchanges that are assigned the exchange number mapped to the slot (e.g., by map 241). For example, if a given slot is mapped to an exchange number X by the map 241, the HBA 230 may be configured to store and retrieve HBA-side metadata for any exchange that is assigned the exchange number X. It will be recalled that once an exchange is completed, the exchange number of the exchange may be assigned to a new exchange, and so forth. At the same time, the HBA 230 may implement and/or enforce access restriction policies that prevent the storage of HBA-side metadata for any exchange that is not assigned the number X (and/or prevent the storage in the given slot of any data that is not HBA-side metadata). As used herein, the term HBA-side metadata for an exchange may refer to information that is maintained on HBA 230 which represents the state of the exchange or the state of HBA 230 with respect to the exchange. By way of example, HBA-side metadata may identify the size of user data associated with the exchange (i.e., the size of data that is being transferred by the exchange), relative offset, details about a SCSI operation that is associated the exchange associated with the exchange number, and so forth.

Memory 210 may include a driver memory space 214. The driver memory space 214 may include a contiguous or non-contiguous portion of the memory 210 that has been allocated to driver 224 by the operating system of computing device 200 (not shown). Driver memory space 214 may include regions 215, 217, and 219.

In general, an entry 227 may be configured to map a given memory slot to a corresponding exchange number when the entry contains both the exchange number and an identifier of the memory slot. In many implementations, more than one slot in region 215 may be mapped to the same reference number.

Processor 220 and/or driver 224 may be configured to restrict the use of each slot in region 215 to storing driver-side metadata for exchanges that are assigned the exchange number mapped to the slot (e.g., by map 212). For example, if a given slot is mapped to an exchange number Y by the map 212, the processor 220 and/or driver 224 may be configured to store and retrieve driver-side metadata from the given slot for any exchange that is assigned the exchange number Y. At the same time, the processor 220 and/or driver 224 may implement and/or enforce access restriction policies that prevent the storage, in the given slot, of driver-side metadata for any exchange that is not assigned the number Y (and/or prevent the storage in the given slot of any data that is not driver-side metadata). As used herein, the term driver-side metadata for an exchange may refer to information that is maintained by driver 224 which represents the state of the exchange or the state of driver 224 with respect to the exchange. By way of example, driver-side metadata may identify the size of user data associated with the exchange (i.e., the size of data that is being transferred by the exchange), relative offset, details about a SCSI operation that is associated the exchange associated with the exchange number, and so forth.

The difference between driver-side metadata and HBA-side metadata is not described in further detail. In some implementations, the operations of driver 224 and HBA 230 may be isolated by design from each other, such that each keeps its own set of metadata for the same exchange (e.g., driver-side metadata and HBA-side metadata, respectively). In general, for any exchange, driver 224 may lack access to the HBA-side metadata for the exchange, and HBA 230 may lack access to the driver-side metadata for the exchange. Any transfer of information between HBA 230 and driver 224 may be carried through events. Broadly speaking, the driver-side metadata for an exchange may include any information that driver 224 needs to keep in order to complete the driver's part of the exchange, and HBA-side metadata for an exchange may include any information that HBA 230 needs to keep in order to complete the HBA's part of the exchange. An HBA-side metadata item may represent the same or different information than a driver-side metadata item. Additionally or alternatively, an HBA-side metadata item may be formatted in the same or different way than a driver-side metadata item.

Region 219 may include a plurality of memory slots. Each memory slot in region 219 may be pre-mapped to a respective one of the exchange numbers in the pool 242. The pre-mapping may be effectuated by a map 211. Map 211 may be stored in memory 210 or elsewhere. As illustrated in FIG. 2C, map 211 may include a plurality of entries 228. Each entry 228 may include a respective identifier of a different one of the plurality of memory slots in region 219. Each entry may further include a respective one of the exchange numbers in the pool 242. In general, an entry 228 may be configured to map a memory slot to a corresponding exchange number when the entry contains both the exchange number and an identifier of the memory slot. In many implementations, more than one slot in region 219 may be mapped to the same reference number.

Region 219 may be accessible by HBA 230. Processor 220 and/or driver 224 (and/or HBA 230) may be configured to restrict the use of each slot in region 219 to storing HBA-side metadata for exchanges that are assigned the exchange number mapped to the slot (e.g., by map 211). For example, if a given slot is mapped to an exchange number Z by map 211, the processor 220 and/or driver 224 (and/or HBA 230), may be configured to store, in the given slot, HBA-side metadata for any exchange that is assigned the exchange number Z. At the same time, the processor 220 and/or driver 224 (or HBA 230) may implement and/or enforce access restriction policies that prevent the storage of HBA-side metadata for any exchange that is not assigned the number Z (and/or prevent the storage of retrieval in the given slot of any data that is not HBA-side metadata).

Region 219 may be used, by HBA 230, as offload memory for storing HBA-side metadata. For example, when the slots in region 244 for a particular exchange number are already full, any additional metadata for the same exchange may be stored in the slots in region 219 that are mapped to the particular exchange number. As another example, when no sufficient space is available in memory 240 to store HBA-side metadata (either in region 244 or elsewhere), the HBA 230 may store the HBA-side metadata in region 219. In some implementations, HBA 230 may access the region 219 by using Direct Memory Access (DMA) commands.

Region 217 may include a plurality of memory slots. The memory slots may be used to store driver-side metadata. Each of the memory slots may be allocated on an on-demand basis (rather than being pre-allocated). For this reason, region 217 is referred to as a "pooled memory region". Each of the slots in region 217 may be mapped to a corresponding exchange number after that number has been allocated to a particular exchange. For example, when a slot in region 217 is allocated to a corresponding exchange, the same memory slot would be deallocated afterwards. After the memory slot is deallocated, the same memory slot may be allocated again to another exchange that has a different exchange number. In other words, the same memory slot in region 217, at different points in time, may be used to store metadata for different exchanges that are assigned different exchange numbers. This is in contrast to the slots in regions 215, 219, and 244, any of which may be limited to storing metadata for exchanges that are given the same exchange number.

Region 217 may be managed by using a map 213. Map 213 may include a plurality of entries 229. Each entry 229 may include an identifier of a different one of the slots in region 217, an exchange number of the exchange to which the slot is assigned (if at all), and an indication of whether the memory slot is currently allocated.

An important distinction between pre-mapped memory slots (i.e., slots in regions 244, 215, and 219) and pooled memory slots (i.e., slots in region 217) is that the pre-mapped memory slots are more resource-efficient to use than pooled memory slots. Pooled memory are required to be allocated from the pool before they are used. The allocation of any pooled memory slots would require the execution of an allocation routine. The allocation routine may involve updating map 213 and/or changing the state of one or more synchronization objects. The execution of the allocation routine would naturally take time and would contribute further to the latency of the exchange. By contrast, pre-allocated memory slots can be used without the execution of such an allocation routine. Rather three use of pre-allocated memory slots requires only the lookup operations to be performed on any of the maps 211, 212, and 241. Stated succinctly, the use of pre-allocated memory slots to store metadata associated with exchanges is advantageous because it does away, at least in part, with the need to allocate memory slots on demand, which in turn shortens the time it takes to store the metadata for various exchange. As used throughout the disclosure, the phrase "allocating a slot in a pooled memory region" refer to assigning the slot to an exchange (or its exchange number) until the exchange is completed, after which the slot can be assigned to another exchange (with a different exchange number).

The provision of regions 215, 215, and 244 in computing device 200 allows at least some of the exchange metadata that would normally be stored in pooled memory to be placed in pre-mapped memory. Because the use of pre-mapped memory does not require the execution of an allocation route beforehand, using pre-mapped memory may take less time than using pooled memory. Stated succinctly, the use of pre-mapped memory is advantageous because it can increase the speed at which transactions can be omitted.

FIGS. 2A-E are provided as an example only. In some implementations, one or more of regions 244, 215, and 219 may be omitted. In some implementations, two or more of maps 211, 212, 213, and 241 may be integrated into the same data structure. In some implementations, two or more of maps 211, 212, 213, and 241 may be implemented as separate data structures.

Figure 3:
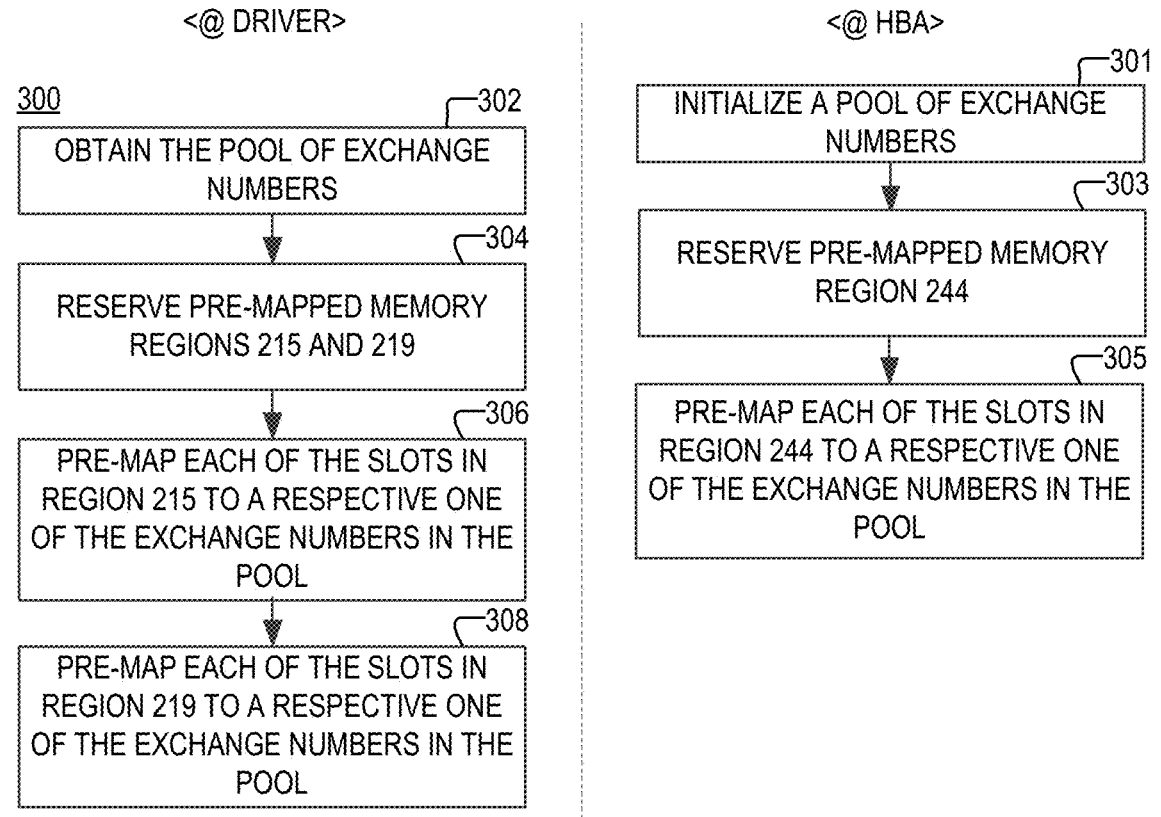
FIG. 3 is a flowchart of an example of a process, according to aspects of the disclosure.

FIG. 3 is a flowchart of an example of a process 300, according to aspects of the disclosure. According to the present example, process 300 is executed as part of an initialization routine that is executed when computing device 200 is started. However, the present disclosure is not limited to the process 300 being executed at any particular time.

At step 301, HBA 230 initializes the pool 242 of exchange numbers.

At step 302, driver 224 obtains an indication of the pool 242. For example, driver 224 may place a request to HBA 230 and receive, in response to the request, an indication of the exchange numbers that constitute the pool 242.

At step 303, HBA 230 reserves region 244 for use as a pre-mapped on-chip memory. In some implementations, reserving the region 244 may include defining a respective plurality of memory slots in region 244 and obtaining an identifier for each of the memory slots.

At step 304, driver 224 reserves regions 215 and 219 for use as a pre-mapped driver and offload memory, respectively. In some implementations, reserving the regions 215 and 219 may include defining a respective plurality of memory slots in each of regions 215 and 219 and obtaining an identifier for each of the memory slots.

At step 305, each of the memory slots in region 244 is pre-mapped by driver 224 to a respective one of the exchange numbers in the pool 242 (initialized at step 301). Pre-mapping the memory slots may include generating and/or updating the map 241 (shown in FIG. 2B).

At step 306, each of the memory slots in region 215 is pre-mapped by Driver 224 to a respective one of the exchange numbers in the pool 242 (obtained at step 302). Pre-mapping the memory slots may include generating and/or updating the map 212 (shown in FIG. 2E).

At step 308, each of the memory slots in region 219 is pre-mapped by driver 224 to a respective one of the exchange numbers in the pool 242 (obtained at step 302). Pre-mapping the memory slots may include generating and/or updating the map 211 (shown in FIG. 2C).

Figure 4:
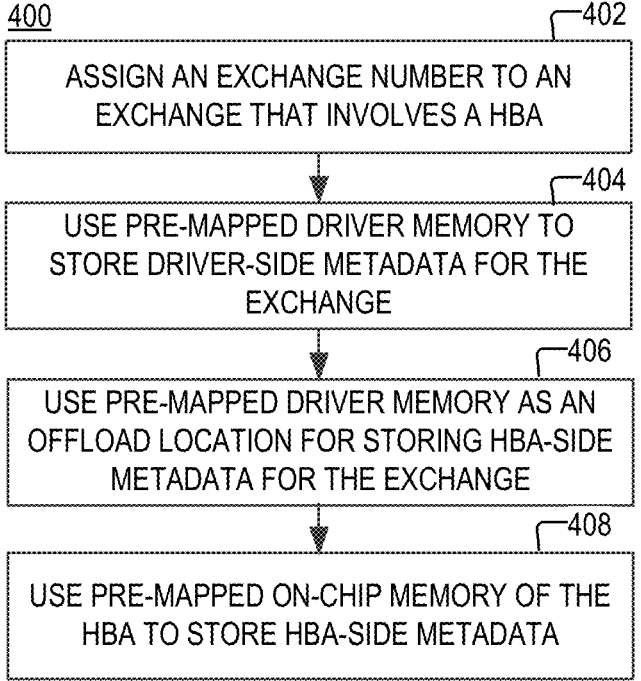
FIG. 4 is a flowchart of an example of a process, according to aspects of the disclosure.

FIG. 4 is a flowchart of an example of a process 400, according to the aspects of the disclosure.

At step 402, an exchange number is assigned to an exchange. The exchange may be initiated either by the driver 224 or the HBA 230.

At step 404, driver 224 uses region 215 to store at least some of the driver-side metadata that is associated with the exchange. The use of region 215 may include: (i) generating or otherwise obtaining a driver-side metadata item associated with the exchange, (ii) performing a search of map 212 to identify a memory slot that is mapped to the exchange number (assigned at step 402), and (iii) storing the metadata item in the in the memory slot that is identified as a result of the search. Furthermore, the use of region 215 may include: (i) performing a search of the map 212 to identify a memory slot that is mapped by map 212 to the exchange number (assigned at step 402), (ii) retrieving the driver-side metadata item from the memory slot, and (iii) using the retrieved driver-side metadata item to complete the exchange on the driver's side.

At step 406, HBA 230 uses region 244 to complete the exchange. The use of region 244 may include: (i) generating or otherwise obtaining an HBA-side metadata item associated with the exchange, (ii) performing a search of map 241 to identify a memory slot that is mapped to the exchange number (assigned at step 402), and (iii) storing the metadata item in the in the memory slot that is identified as a result of the search. Furthermore, the use of region 244 may include: (i) performing a search of the map 241 to identify a memory slot that is mapped by map 241 to the exchange number (assigned at step 402), (ii) retrieving the HBA-side metadata item from the memory slot, and (iii) using the retrieved HBA-side metadata item to complete the exchange on the HBA's side.

At step 408, HBA 230 uses the region 219 to complete the exchange. The use of region 219 may include: (i) generating or otherwise obtaining an HBA-side metadata item associated with the exchange, (ii) detecting that HBA-side metadata item should be stored in offload memory (e.g., because on-chip memory 240 is full), (iii) performing a search of map 211 to identify a memory slot that is mapped to the exchange number (assigned at step 402), and (iv) storing the metadata item in the in the memory slot that is identified as a result of the search. Furthermore, the use of region 219 may include: (i) performing a search of the map 211 to identify a memory slot that is mapped by map 211 to the exchange number (assigned at step 402), (ii) retrieving the HBA-side metadata item from the memory slot, and (iii) using the retrieved HBA-side metadata item to complete the exchange on the HBA's side.

FIG. 4 is provided for illustrative purposes only. At least some of the steps in FIG. 4 may be performed concurrently, in a different order, or altogether omitted. Those of ordinary skill in the art would readily recognize, after reading the present disclosure, that various other actions may need to be performed when a metadata item is stored in a slot. Such actions may include detecting whether the slot is already used to store another metadata item for the same exchange or detecting whether the slot is large enough to accommodate the data item.

Figure 5:
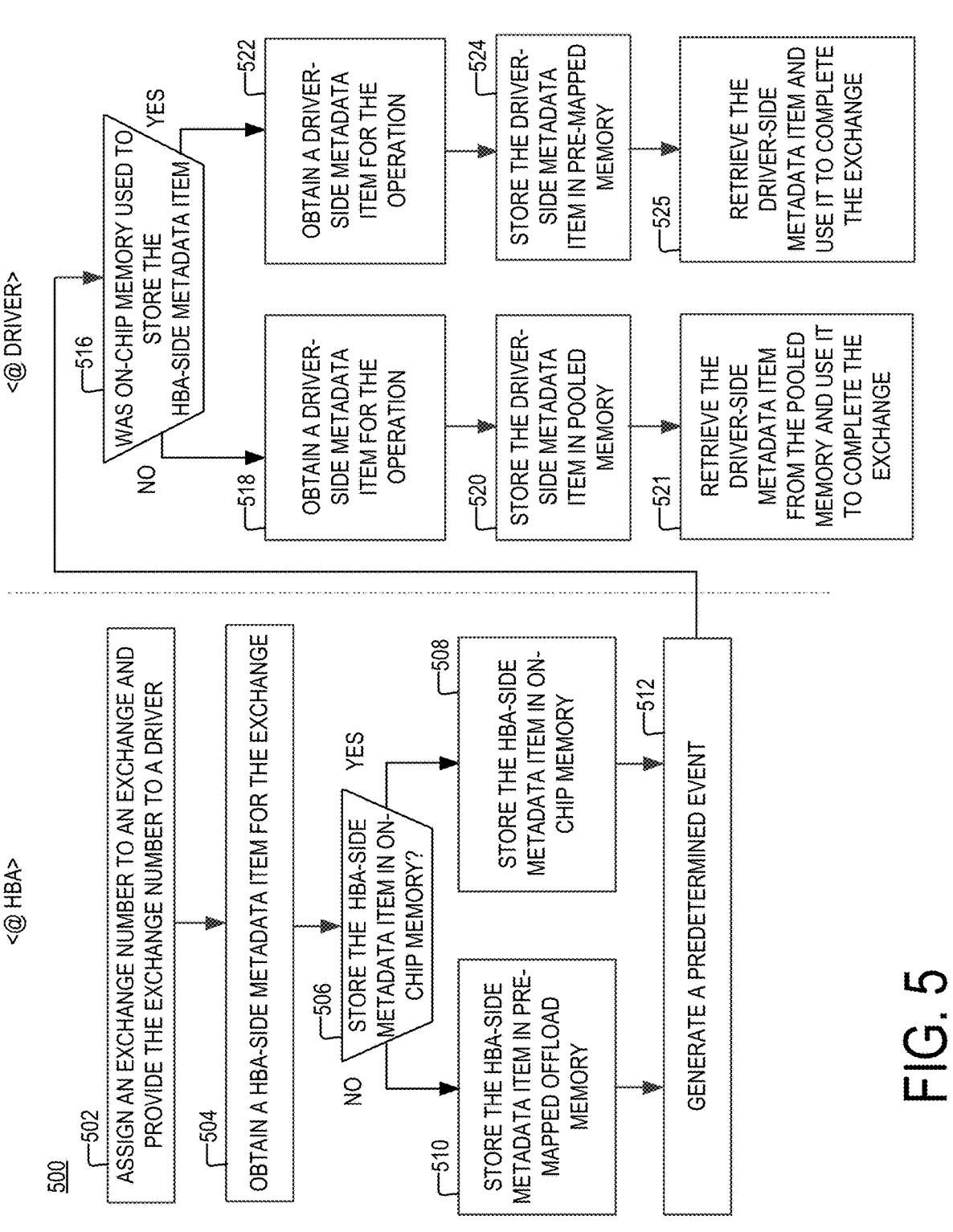
FIG. 5 is a flowchart of an example of a process, according to aspects of the disclosure.

FIG. 5 is a flowchart of an example of a process 500, according to aspects of the disclosure.

At step 502, HBA 230 assigns an exchange number to an exchange and provides the exchange number to driver 224.

At step 504, HBA 230 obtains an HBA-side metadata item for the exchange. The HBA-side metadata item may include some or all of the HBA-side metadata for the exchange. For example, the HBA-side metadata item may include at least one of a particular relative offset in memory 240, an indication of the size of user data associated with the exchange, and/or any other suitable information.

At step 506, HBA 230 determines whether to store the HBA-side metadata item in the on-chip memory 240. Specifically, HBA 230 may determine if a predetermined condition is satisfied. If the condition is satisfied, process 500 proceeds to step 508, and the HBA-side metadata is stored in region 244 of the on-chip memory 240. Otherwise, if the condition is not satisfied, process 500 proceeds to step 510, and the HBA-side metadata is stored in region 219 of the driver memory space 214. In one example, the condition may be satisfied if there is a slot in region 244 that is pre-mapped to the exchange number (assigned at step 402), and which is available to receive the HBA-side metadata item. In this example, the condition may evaluate to false if no such slot is available.

At step 508, driver 224 stores the HBA-side metadata in one of the slots in region 244 that is pre-mapped to the exchange number (assigned at step 502). The slot may be selected (or identified) by performing a search of map 241 for a slot that is mapped to the exchange number.

At step 510, the HBA-side metadata item is stored in a slot in region 219 that is pre-mapped to the exchange number (assigned at step 502). The slot may be selected (or identified) by performing a search of map 241 for a slot that is mapped to the exchange number.

At step 512, HBA 230 generates a predetermined event for notifying driver 224 that the HBA-side metadata item has been generated.

At step 516, driver 224 detects the event (generated at step 512) and determines whether the HBA-side metadata item, which is associated with the event, was stored in on-chip memory 240 (or region 244, in particular) or in the offload memory (e.g., region 219). The determination may be performed based on a reference number that is contained in the event and/or in any other suitable manner. If the HBA-side metadata associated with the exchange was stored in the on-chip memory 240, process 500 proceeds to step 522. Otherwise, if the HBA-side metadata associated with the exchange was stored in offload memory, process 500 proceeds to step 518.

At step 518, driver 224 obtains a driver-side metadata item for the exchange. The driver-side metadata item may include some or all of the driver-side metadata for the exchange. For example, the driver-side metadata item may include at least one of a particular relative offset in memory 210, an indication of the size of user data associated with the exchange, and/or any other suitable information.

At step 520, driver 224 stores the driver-side metadata item (obtained at step 518) in the pooled region 217. The slot may be selected (or identified) by performing a search of map 212 for a slot that is mapped to the exchange number.

At step 521, driver 224 retrieves the driver-side metadata item from the pooled memory region and uses the driver-side metadata item to complete the exchange.

At step 522, driver 224 obtains a driver-side metadata item for the exchange. The driver-side metadata item may include some or all of the driver-side metadata for the exchange. For example, the driver-side metadata item may include at least one of a particular relative offset in memory 210, an indication of the size of user data associated with the exchange, and/or any other suitable information.

At step 524, driver 224 stores the driver-side metadata item (obtained at step 522) in a slot in region 215 that is pre-mapped to the exchange number (assigned at step 512). The slot may be selected (or identified) by performing a search of map 212 for a slot that is mapped to the exchange number.

At step 525, driver 224 retrieves the driver-side metadata item from the slot in region 215 and uses it to complete the exchange on the driver's side.

FIG. 5 is provided as an example only. At least some of the steps in process 500 may be performed concurrently, in a different order, or altogether omitted. In some implementations, HBA 230 may perform one or more error checks and execute step 510 only if none of the checks yields an error. In some implementations, HBA 230 may have the capability to store the HBA-side metadata item in a portion of on-chip memory (e.g., outside portion) that is outside of region 244. In such implementations, the HBA 230 may use an internal memory allocation scheme to allocate this portion. The internal memory allocation scheme may require the use of additional resources, which in turn makes the use of region 244 more efficient. In some implementations, the outside portion may be used only if HBA 230 has determined that the HBA-side metadata item cannot be stored in region 244. In some implementations, a metadata item may be stored in more than one slot of regions 244, 215, or 219. In some implementations, step 524 may be executed only if one or more slots are available in region 215 which can accommodate the driver-side data item. If no such slots are available (e.g., because they already store other metadata), the driver-side metadata item may be stored in the pooled memory region 217.

FIG. 5 is provided as an example to illustrate that the concepts and ideas presented throughout the disclosure allow the HBA 230 to choose between on-chip and offload memory, as well as between pre-mapped and pooled memory. FIG. 5 is provided as an example to illustrate that the concepts and ideas presented throughout the disclosure allow driver 224 to select between pooled memory and pre-mapped memory. The conditions that drive the choice between different types of memory can vary depending on the implementation, and they can be readily determined by one of ordinary skill in the art, after reading the present disclosure.

FIGS. 1-5 are provided as an example only. At least some of the steps discussed with respect to FIGS. 1-5 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Although the examples provided throughout the disclosure concern exchanges over a fibre channel network, the present disclosure is not limited to any specific type of network used.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard. (1/23)

It will be further understood that various changes in the details, materials, and arrangements of the parts which have been described and illustrated in order to explain the nature of the claimed invention might be made by those skilled in the art without departing from the scope of the following claims.

What is claimed is:

1. A method for use in a computing device, the method comprising:

obtaining, by a processor of the computing device, an indication of a pool of exchange numbers, the indication of the pool of exchange numbers being obtained from a host bus adapter (HBA) of the computing device, the pool of exchange numbers including a plurality of exchange numbers, each of the exchange numbers being a unique identifier that is used by the HBA to track data exchanges between the HBA and external computing devices;

pre-mapping each of a plurality of first slots in a driver memory of the computing device to the pool of exchange numbers, wherein pre-mapping each of the plurality of first slots includes updating a first data structure to map each of the plurality of first slots to a respective one of the exchange numbers in the pool, the pre-mapping being performed after the indication of the pool of exchange numbers is obtained; and using, by the processor, the plurality of first slots to execute one or more exchanges that involve the HBA, the exchanges being initiated after the pre-mapping is performed, wherein executing any given one of the exchanges includes assigning, to the given exchange, one of the exchange numbers in the pool and using one of the plurality of first slots that is pre-mapped to the assigned exchange number to store driver-side metadata for the given exchange, wherein the processor is configured to restrict use of each of the plurality of first slots to storing only driver-side metadata associated with exchanges which are assigned the exchange number that is pre-mapped to the first slot.

2. The method of claim 1, further comprising:

pre-mapping, by the processor, each of a plurality of second slots in the driver memory of the computing device to the pool of exchange numbers, wherein pre-mapping each of the plurality of second slots includes updating a second data structure to map each of the plurality of second slots to a respective one of the exchange numbers in the pool, and using, by the HBA, each of the plurality of second slots as offload memory for storing HBA-side metadata, wherein the processor and/or HBA are configured to restrict use of each of the plurality of second slots to storing only HBA-side metadata associated with exchanges which are assigned the exchange number that is pre-mapped to the second slot.

3. The method of claim 2, wherein the first data structure and the second data structure are integral with each other.

4. The method of claim 2, further comprising:

pre-mapping, by the HBA, each of a plurality of third slots in a local memory of the HBA to the pool of exchange numbers, wherein pre-mapping each of the plurality of third slots includes updating a third data structure to map each of the plurality of third slots to a respective one of the exchange numbers in the pool, and using, by the HBA, each of the plurality of third slots to execute the one or more exchanges, wherein the HBA is configured to restrict use of each of the plurality of third slots to storing only HBA-side metadata associated with exchanges that are assigned the exchange number which is pre-mapped to the third slot.

5. The method of claim 4, wherein the local memory includes on-chip memory and the third data structure is stored in the on-chip memory, the on chip memory of including at least one of a memory that is provided in a first semiconductor package of an on-board controller of the HBA and/or a memory that is provided in a second semiconductor package that is different from the first semiconductor package, the first semiconductor package being mounted on a circuit board that constitutes the HBA, and the second semiconductor package being mounted on a circuit board that constitutes the HBA.

6. The method of claim 4, wherein the local memory of the HBA includes an on-chip memory of the HBA and the driver memory includes a portion of a random-access memory of the computing device that has been allocated to a driver of the HBA.

7. The method of claim 1, wherein the HBA includes a Fibre Channel host bus adapter.

8. A system, comprising:

a host bus adapter (HBA);

a memory module having a portion thereof allocated as a driver memory for the HBA;

a processor that is operatively coupled to the memory module and HBA, the processor being configured to perform the operations of:

obtaining an indication of a pool of exchange numbers, the indication of the pool of exchange numbers being obtained from the HBA, the pool of exchange numbers including a plurality of exchange numbers, each of the exchange numbers being a unique identifier that is used by the HBA to track data exchanges between the HBA and external computing devices;

pre-mapping each of a plurality of first slots in the driver memory to the pool of exchange numbers, wherein pre-mapping each of the plurality of first slots includes updating a first data structure to map each of the plurality of first slots to a respective one of the exchange numbers in the pool, the pre-mapping being performed after the indication of the pool of exchange numbers is obtained; and using the plurality of first slots to execute one or more exchanges that involve the HBA, the exchanges being initiated after the pre-mapping is performed, wherein executing any given one of the exchanges includes assigning, to the given exchange, one of the exchange numbers in the pool and using one of the plurality of first slots that is pre-mapped to the assigned exchange number to store driver-side metadata for the given exchange, wherein the processor is configured to restrict use of each of the plurality of first slots to storing only driver-side metadata associated with exchanges which are assigned the exchange number that is pre-mapped to the first slot.

9. The system of claim 8, wherein:

the processor is further configured to perform the operation of pre-mapping each of a plurality of second slots in the driver memory to the pool of exchange numbers, wherein pre-mapping each of the plurality of second slots includes updating a second data structure to map each of the plurality of second slots to a respective one of the exchange numbers in the pool, each of the plurality of second slots is used as offload memory for storing HBA-side metadata, and the processor and/or HBA are configured to restrict use of each of the plurality of second slots to storing only HBA-side metadata associated with exchanges which are assigned the exchange number that is pre-mapped to the second slot.

10. The system of claim 9, wherein the first data structure and the second data structure are integral with each other.

11. The system of claim 9, wherein the HBA is configured to:

pre-map each of a plurality of third slots in a local memory of the HBA to the pool of exchange numbers, the pre-mapping including updating a third data structure to map each of the plurality of third slots to a respective one of the exchange numbers in the pool, and use each of the plurality of third slots to execute the one or more exchanges, and restrict use of each of the plurality of third slots to storing only HBA-side metadata associated with exchanges that are assigned the exchange number which is pre-mapped to the third slot.

12. The system of claim 11 wherein the local memory includes on-chip memory and the third data structure is stored in the on-chip memory, the on-chip memory including at least one of a memory that is provided in a first semiconductor package of an on-board controller of the HBA and/or a memory that is provided in a second semiconductor package that is different from the first semiconductor package, the first semiconductor package being mounted on a circuit board that constitutes the HBA, and the second semiconductor package being mounted on a circuit board that constitutes the HBA.

13. The system of claim 11, wherein the local memory of the HBA includes an on-chip memory of the HBA and the driver memory is allocated to a driver of the HBA.

14. The system of claim 8, wherein the HBA includes a Fibre Channel host bus adapter.

15. A non-transitory computer-readable medium storing one or more processor-executable instructions which, when executed by a processor of a computing device, cause the processor to perform the operations of:

obtaining an indication of a pool of exchange numbers, the indication of the pool of exchange numbers being obtained from a host bus adapter (HBA) of the computing device, the pool of exchange numbers including a plurality of exchange numbers, each of the exchange numbers being a unique identifier that is used by the HBA to track data exchanges between the HBA and external computing devices;

pre-mapping each of a plurality of first slots in a driver memory of the computing device to the pool of exchange numbers, wherein pre-mapping each of the plurality of first slots includes updating a first data structure to map each of the plurality of first slots to a respective one of the exchange numbers in the pool, the pre-mapping being performed after the indication of the pool of exchange numbers is obtained; and using the plurality of first slots to execute one or more exchanges that involve the HBA, the exchanges being initiated after the pre-mapping is performed, wherein executing any given one of the exchanges includes assigning, to the given exchange, one of the exchange numbers in the pool and using one of the plurality of first slots that is pre-mapped to the assigned exchange number to store driver-side metadata for the given exchange, wherein the processor is configured to restrict use of each of the plurality of first slots to storing only driver-side metadata associated with exchanges which are assigned the exchange number that is pre-mapped to the first slot.

16. The non-transitory computer-readable medium of claim 15, wherein:

the one or more processor-executable instructions which, when executed by the processor of the computing device, further cause the processor to perform the operation of pre-mapping each of a plurality of second slots in the driver memory of the computing device to the pool of exchange numbers, wherein pre-mapping each of the plurality of second slots includes updating a second data structure to map each of the plurality of second slots to a respective one of the exchange numbers in the pool, each of the plurality of second slots is used by the HBA as offload memory for storing HBA-side metadata, and the processor and/or HBA are configured to restrict use of each of the plurality of second slots to storing only HBA-side metadata associated with exchanges which are assigned the exchange number that is pre-mapped to the second slot.

17. The non-transitory computer-readable medium of claim 16, wherein the first data structure and the second data structure are integral with each other.

18. The non-transitory computer-readable medium of claim 16, wherein:

the one or more processor-executable instructions, when executed by the processor of the computing device, further cause the processor to perform the operation of pre-mapping, by the HBA, each of a plurality of third slots in a local memory of the HBA to the pool of exchange numbers, pre-mapping each of the plurality of third slots includes updating a third data structure to map each of the plurality of third slots to a respective one of the exchange numbers in the pool, each of the plurality of third slots is used to execute the one or more exchanges, and the HBA is configured to restrict use of each of the plurality of third slots to storing only HBA-side metadata associated with exchanges that are assigned the exchange number which is pre-mapped to the third slot.

19. The non-transitory computer-readable medium of claim 18, wherein the local memory includes on-chip memory and the third data structure is stored in the on-chip memory, the on-chip memory including at least one of a memory that is provided in a first semiconductor package of an on-board controller of the HBA and/or a memory that is provided in a second semiconductor package that is different from the first semiconductor package, the first semiconductor package being mounted on a circuit board that constitutes the HBA, and the second semiconductor package being mounted on a circuit board that constitutes the HBA.

20. The non-transitory computer-readable medium of claim 18, wherein the local memory of the HBA includes an on-chip memory of the HBA and the driver memory includes a portion of a random-access memory of the computing device that has been allocated to a driver of the HBA.

* * * * *